United States Patent [19]

Jones et al.

[11] 4,326,962

[45] Apr. 27, 1982

[54] SULFUR-CONTAINING LIGNINS AS MAGNESIUM SULFITE TRI-HYDRATE DISPERSANTS

[75] Inventors: Robert L. Jones, Newtown; Lewis Volgenau, Ivyland; Philip S. Davis, Furlong, all of Pa.

[73] Assignee: Betz Laboratories, Inc., Trevose, Pa.

[21] Appl. No.: 702,634

[22] Filed: Jul. 6, 1976

[51] Int. Cl.$^3$ .............................................. C02F 5/10
[52] U.S. Cl. .................................. 210/698; 252/180
[58] Field of Search ............... 55/73; 210/54, 58, 698, 210/730; 252/180, 181; 423/242, 268, 512 A

[56] References Cited

U.S. PATENT DOCUMENTS

| | | | |
|---|---|---|---|
| 3,766,077 | 10/1973 | Hwa et al. | 210/58 |
| 3,801,699 | 4/1974 | Arnold | 210/58 |
| 3,829,388 | 8/1974 | Lange et al. | 210/58 |
| 3,849,328 | 11/1974 | Schievelbein et al. | 210/58 |
| 3,880,620 | 4/1975 | Lange et al. | 55/73 |
| 3,989,810 | 11/1976 | Toyama et al. | 55/73 |

*Primary Examiner*—Peter A. Hruskoci
*Attorney, Agent, or Firm*—Alexander D. Ricci; Bruce E. Peacock

[57] ABSTRACT

The present invention relates to a method for treating an aqueous medium containing magnesium sulfite trihydrate under precipitating conditions which method comprises adding to the medium an effective amount for the purpose of a sulfur-containing lignin.

6 Claims, No Drawings

SULFUR-CONTAINING LIGNINS AS MAGNESIUM SULFITE TRI-HYDRATE DISPERSANTS

The present invention relates to a method for treating an aqueous medium and more particularly to a method for treating an aqueous medium containing magnesium sulfite tri-hydrate under precipitating conditions to prevent the formation of scale on surfaces in contact with the aqueous medium. Since magnesium sulfite tri-hydrate scale is considered to be a particularly bothersome problem in magnesium oxide based gas scrubbers for scrubbing sulfur-containing exhaust gases, the present invention will be described as it relates to such scrubbers.

The use of wet scrubber systems to remove gaseous and particulate material from waste stack gases is increasing. These wet scrubber systems are used in cleaning effluent from boiler stacks, incinerator stacks, lime kilns, foundries, blast furnaces, basic oxygen furnaces (BOF), open hearth units, coke plants, paper mill recovery boilers, pet food manufacturing facilities, electric furnaces, smelters, asphalt plants and many others.

The present invention is directed at those effluents which contain sulfurous gases. Indeed, $SO_2$ and $SO_3$ gases are found in the effluents from any furnace or boiler system where high sulfur fuels are used.

According to an important feature of these gas scrubber systems, a scrubber medium in liquid slurry form is contacted with stack gases to absorb the sulfur oxides therefrom. While many scrubber systems use lime or limestone as the scrubber medium, magnesium oxide has also been used. In most cases, the scrubber medium must be treated to control deposits formed on surfaces in contact with the medium.

It was observed by the present inventors that, although deposit control treatments were being added to the scrubber medium in a magnesium oxide based scrubber system, a particularly difficult deposit was still forming on surfaces in contact with the scrubber medium. This peculiar and difficult deposit was determined to be magnesium sulfite tri-hydrate (MST). Despite their attempts at dispersing MST using many known dispersants, the present inventors were repeatedly unsuccessful. Accordingly, the present invention is generally drawn to those materials which the present inventors did discover to have dispersant efficacy with respect to the tri-hydrate form of magnesium sulfite in an aqueous medium.

According to the present invention, a sulfur-containing lignin is added to an aqueous medium containing magnesium sulfite tri-hydrate under precipitating conditions in an amount effective for the purpose of dispersing the magnesium precipitate. As already noted, this treatment finds particular use in magnesium oxide based gas scrubber systems for removing sulfur-containing gases. The term sulfur-containing lignin is intended to include mixtures of such lignins.

As already noted, the materials covered by the present invention are sulfur-containing lignins. Lignosulfonates have proven to be particularly efficacious in dispersing MST. The sulfur-containing acid lignins are preferred. In this respect it is noted that two broad classes of lignin derivatives are recognized based on the method of extraction of the lignin material. These two classes will be referred to as alkali lignins and acid lignins.

The alkali lignins are typically made by first cooking wood chips in a solution of caustic and sodium sulfide. The lignin with wood is modified into a sodium compound which is very soluble in the alkaline solution. By lowering the pH of the solution, the alkali lignins are precipitated out. These alkali lignins can be sold as is or used to prepare the various lignin derivatives by methods known to those skilled in the art.

The acid lignins are generally made by cooking wood chips under pressure in a solution of sulfurous acid and calcium, magnesium, sodium, or ammonium bisulfate. This process converts insoluble lignins to soluble lignosulfonic acids. These lignosulfonic acids can be sold or used as is or can be converted to various salt forms for sale or use.

Indeed, numerous patents disclose the use of sulfur-containing lignins in a dispersant treatment for an aqueous medium. For example, U.S. Pat. No. 3,849,328 discloses the use of sulfonated alkali lignin compounds to inhibit mineral-scale formation on surfaces in contact with mineralized waters. Also for example, U.S. Pat. No. 3,829,388 discloses the use of a lignin which is first acid treated and subsequently base treated for controlling scale formations in aqueous systems. Also for example, U.S. Pat. No. 3,766,077 discloses the use of lignosulfonates in conjunction with water-soluble acrylic polymers to prevent scaling of surfaces in contact with aqueous solutions. None of these references discloses the efficacy of a sulfur-containing lignin with respect to dispersing magnesium sulfite tri-hydrate in an aqueous medium. In fact, the last-mentioned U.S. Pat. No. (3,766,077) states that the use of sodium lignosulfonate alone did not satisfactorily control scaling caused by the alkaline earth salts tested. As already noted above, most of the materials tested for MST dispersant activity demonstrated little or no such activity.

Those materials which were tested and demonstrated little or no MST dispersant activity could be generically described as polyacrylates, phosphates, a sodium salt of a polycarboxylic acid, chelants, phosphonate and a sodium salt of condensed naphthalene sulfonic acid.

Depending on the nature and severity of the problem, the amount of sulfur-containing lignin (hereinafter referred to as lignin) added to the MST-containing aqueous medium will vary over quite a wide range. Treatment levels could be as low as about one part lignin, on an actives basis, per million parts of aqueous medium. The preferred lower limit is about five parts per million. Also, treatment levels up to about one thousand parts of lignin per million parts of aqueous medium could be used; however, an upper limit of about 100 parts per million is preferred.

As already noted above, the present inventive method is considered to be particularly useful in a magnesium oxide-based gas scrubber system for removing sulfur-containing gases from a gas stream. Indeed, it is predominantly in these scrubber systems that the peculiar and difficult MST deposition problem exists. The efficiency of these gas scrubber systems in removing $SO_2$ gases increases as the pH of the scrubbing liquid increases; however, the severity of the MST deposition problem also increases with increases in pH, causing severe mechanical disruptions which effectively lower the operating efficiency of the system. Accordingly, the present inventive method is particularly useful at such high pH values of greater than about 7. Since most of the scrubber systems operate at a pH value no greater than 9, the present inventive method is considered to be particularly useful at pH's of up to about 9 in such systems.

EXAMPLES

A series of tests were conducted to determine the comparative activity of many treatment materials with respect to dispersing the tri-hydrate form of magnesium sulfite in an aqueous medium. The comparisons were based upon a determination of light transmission (T) through an aqueous medium containing the MST, using a standard optical cell. The light transmission readings were taken thirty minutes after each treatment was added. Using the T readings, a "Dispersion Efficiency Factor" was calculated using the following formula:

$$Y = 100 - 1.75X$$

where
X = T 30 minutes after treatment, and
Y = Dispersion Efficiency Factor

Accordingly, the higher the Dispersion Efficiency Factor, the more effective was the treatment.

The test procedures used in comparing the various treatments were as follows. To a weighing bottle was added 0.45 gram of magnesium sulfite tri-hydrate which had been ground to pass 120 mesh. Next, the treatment was added to the desired level and the net weight was adjusted to 15 grams with distilled water at 50° C. making a 3% slurry of MST. The resultant mixture was transferred to a 0.5 cm optical cell and agitated, and the transmittance (T) was recorded as a function of time.

The treatment materials tested are listed below in Table 1.

TABLE 1

| Product No. | Chemical Description |
|---|---|
| 1 | Sodium lignosulfonate |
| 2 | Partially desulfonated lignosulfonate |
| 3 | Lignosulfonate with modified sugar acids |
| 4 | High molecular weight polymerized sodium lignosulfonate |
| 5 | Sodium polyacrylamide (molecular weight = 6,000–10,000) |
| 6 | Polyacrylamide |
| 7 | Polyacrylate (molecular weight ≅ 90,000) |
| 8 | Polyacrylate (molecular weight ≅ 7,000–10,000) |
| 9 | Polyacrylate different from Products 7 and 8 |
| 10 | Sodium salt of condensed naphthalene sulfonic acid |
| 11 | Ammonium lignosulfonate |
| 12 | Sodium tripolyphosphate |
| 13 | Tetrapotassium pyrophosphate |
| 14 | Complex phosphate |
| 15 | Ethylenediaminetetraacetic acid |
| 16 | Chelant |
| 17 | Phosphonate |
| 18 | Polycarboxylic acid |

Product 1, reported in Table 1 above, is sold under the tradename Maratan 22 by American Can Company; Product 2 is sold as Maracell E by American Can Company; Product 3 is sold as Kelig 32 by American Can Company; Product 4 is sold as Marasperse 22P by American Can Company; and Product 11 is sold as Lignosol TSD by Lignosol Chemicals Company.

In addition to the sulfur-containing lignins which are the subject of the present patent application, two other materials were discovered to have MST dispersant activity. These materials are the subjects of separate applications filed by the present applicant and can be broadly described as a metal salt of a copolymer of a 1-olefin and an unsaturated anhydride and as an oligomer having an average molecule of the following formula:

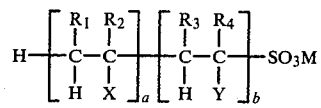

where the structural units are randomly distributed in the molecule, where M is a water-soluble cation of the bisulfite salt, $R_1$, $R_2$, $R_3$ and $R_4$ are hydrogen, methyl or ethyl, Y is one or more hydropholic groups which, when attached to a vinyl group, form a water-soluble homopolymer, X is one or more hydrophobic groups which, when attached to a vinyl group, form a water-soluble homopolymer, and a and b are broadly between 4 and 250.

The results of the series of tests are reported below in Table 2. The activities of the respective compounds were compared at 30 ppm (based on total volume), since that level was determined to be a particularly suitable one for the comparison. A negative value indicates that the treatment acted as a flocculant.

TABLE 2

| Product No. | Dispersion Efficiency Factor |
|---|---|
| 1 | 19 |
| 2 | 7.5 |
| 3 | 15.5 |
| 4 | 53 |
| 5 | −33 |
| 6 | −40 |
| 7 | −59 |
| 8 | −19 |
| 9 | −22.5 |
| 10 | 4 |
| 11 | 41.5 |
| 12 | 6.5 |
| 13 | −3 |
| 14 | −28 |
| 15 | 0 |
| 16 | 0 |
| 17 | 0 |
| 18 | −11 |

As can be seen from Table 2, the sulfur-containing lignins, on the whole, far outperformed the remaining products in dispersing MST.

Several of the sulfur-containing compounds were also tested at treatment levels of 10 ppm actives and 50 ppm actives (based on total volume) and the results are reported below in Table 3.

TABLE 3

| Product No. | Dispersion Efficiency Factor | |
|---|---|---|
| | 10 ppm | 50 ppm |
| 1 | 9.5 | 29.5 |
| 3 | 2 | 19 |
| 4 | 1 | 87 |
| 13 | 10 | 62.5 |

From Table 3, it can be seen that the sulfur-containing lignins are efficacious over a wide treatment level range.

Having thus described our invention, what we claim is:

1. A method for dispersing magnesium sulfite trihydrate contained in an aqueous medium comprising adding to the medium an effective amount for the purpose as a dispersant of a lignosulfonate.

2. The method of claim 1, wherein the dispersant is added in an amount of from 1 to about 1,000 parts per million parts of aqueous medium.

3. The method of claim 2 wherein the dispersant is added in an amount of from about 5 parts to about 100 parts per million.

4. The method of claim 1, 2 or 3 wherein said lignosulfonate comprises a lignosulfonic acid.

5. The method of claim 4 wherein the aqueous medium is the scrubber medium for a magnesium oxide based scrubber system.

6. The method of claim 5, wherein the aqueous medium has a pH of from about 7 to about 9.

* * * * *